US006856615B1

(12) United States Patent
Barve

(10) Patent No.: US 6,856,615 B1
(45) Date of Patent: Feb. 15, 2005

(54) STRATUM TRACEABLE CLOCK DRIVER FOR VOICE DEJITTERING AND CONTROL

(75) Inventor: Milind A. Barve, Thousand Oaks, CA (US)

(73) Assignee: Occam Networks, Santa Barbara, CA (US)

( * ) Notice: Subject to any disclaimer, the term of this patent is extended or adjusted under 35 U.S.C. 154(b) by 881 days.

(21) Appl. No.: 09/638,522

(22) Filed: Aug. 11, 2000

(51) Int. Cl.[7] .............................. H04L 12/66; H04J 3/06

(52) U.S. Cl. ........................................ 370/352; 370/516

(58) Field of Search ................................ 370/351–352, 370/401–402, 503, 516–519, 395.62; 375/355–356, 370–376; 710/48, 266, 267, 260, 263

(56) References Cited

U.S. PATENT DOCUMENTS

| | | | |
|---|---|---|---|
| 6,269,095 B1 * | 7/2001 | Neubauer et al. | 370/503 |
| 6,278,718 B1 * | 8/2001 | Eschholz | 370/503 |
| 6,304,911 B1 * | 10/2001 | Brcich et al. | 370/516 |
| 6,567,400 B1 * | 5/2003 | Zhang et al. | 370/352 |
| 6,658,027 B1 * | 12/2003 | Kramer et al. | 370/516 |

OTHER PUBLICATIONS

MPC8260 PowerQUICC II™ User's Manual, Motorola Inc., Apr. 1999, Rev. O Part I, Overview.

QMC Supplement to MC68360 and MPC860 User's Manuals, Motorola, Inc., Aug., 1997.

TMS320C6201, TMS320C6201B, Digital Signal Processors, Texas Instruments, Aug., 1999, Rev.

"Clock Accuracy: Free Run or Holdover," Ed M. Underwood, Datum 1998/99, http://www.efratom.com/clockacc.html.

"Keeping in sync with Sonet," Mike Green, et al, Sep. 15, 1997, http://www.americasnetwork.com/issues/97issues/970915/091597_sonet.html.

* cited by examiner

*Primary Examiner*—Steven Nguyen
(74) *Attorney, Agent, or Firm*—Blakely, Sokoloff, Taylor & Zafman LLP

(57) ABSTRACT

According to an embodiment of the invention, the voice processing logic for a node in a packet-based network includes a shared memory, a counter to be clocked by a signal derived from a stratum traceable clock (STC) reference, a processor, a digital signal processor (DSP) system, and an interface to a time division multiplexed (TDM) bus. The processor is to execute a number of instructions stored in program memory, to thereby process voice payload into a number of voice packets, where the voice payload has been obtained from a number of network packets sent by the sender machine through the network. The host system buffers the voice packets before writing them to the shared memory. One or more voice packets are written in response to a processor interrupt received from the counter. The DSP system is to read the voice packets from the shared memory before processing them, while the TDM bus interface transmits voice data of one or more channels, from the packets processed by the DSP system, over the TDM bus and according to a TDM bus clock. This bus clock is also derived from the STC reference. In this way, the transfer of packets from the host to the DSP is controlled to correspond to the STC reference, so that the delivery and pickup of the voice stream at the TDM bus occurs at essentially the same rate as their counterparts in the sender machine. Such an effect may be achieved without requiring a dedicated TDM controller chip.

28 Claims, 5 Drawing Sheets

Network
104
_delay_
_delay_
114
Host
HW/SW
128
DSP
System
132
TDM
Chip
136
120

Sender
Machine
106
Recipiet
Machine
108
112
Voice
Capture
TDM
Clock
PLL
CRC
138
116
Voice
Processing
114
120
STC
Ref.
118
109
Ref.
Oscillator

STRATUM TRACEABLE CLOCK DRIVER FOR VOICE DEJITTERING AND CONTROL

FIELD OF THE INVENTION

This invention is generally related to voice communication over a packet-based network, and more particularly to a hardware/software architecture of a node in the network, to help reduce jitter.

BACKGROUND INFORMATION

Speech may be communicated between two parties over a packet-based network 104 as shown in FIG. 1. Coupled to the network 104 are a sender machine 106 and a recipient machine 108. To communicate voice through the network 104, the voice of a first party 109 is first digitized, at a given sampling rate, into a voice stream by a voice capture device 112. The voice capture device may be part of a digital TDM link (e.g. Digital Services levels, DSx) or may be part of an analog telephone interface, e.g. subscriber line interface circuit (SLIC). The stream is then arranged into network packets by a voice processing device 114. These packets are then sent, through the At network, to the recipient machine 108 of a second party 116 where they are reassembled into the original stream and played back. These series of operations may also occur in reverse, where the sender and recipient roles of the machines: are reversed, so that a two-way conversation can be had between the parties.

Though the packets may be sent into the network 104 at a fixed rate, the packets often are not received by the recipient at the fixed rate, because the packets encounter varying delays while traveling through the network. This creates the undesirable situation at the recipient machine 108 of running out of packets while reassembling the voice stream, which undesirably introduces breaks during playback. The "jitter" worsens as the network delays become longer and more unpredictable with more complex networks, i.e. those having a large number of nodes that connect the source and recipient machines such as in a single wide area network (WAN), a collection of WANs, or in the Internet.

To alleviate jitter, buffers may be used in various nodes in the network 104 and in the end nodes, i.e. the recipient and sender machines 108,106. The buffers store some of the incoming voice data before this data is forwarded or reassembled into the voice stream, to avoid "under-runs" or running out of data in the event packet arrival is delayed. However, buffering hampers real time, two way conversations if it introduces excessive delay into the conversation. In addition, too little buffering, in view of the rate at which incoming data arrives, creates "over-runs" as the incoming data must be discarded since the buffer is full.

One way to optimize (here, minimize) buffering is to ensure that the reassembling of the voice stream at the recipient machine 108 occurs at the sampling rate used to create the stream at the sender machine 106. This may be done by giving the sender and recipient machines access to a stratum traceable clock (STC) reference 118, so that the creation and re-creation of the data bytes that constitute the voice stream occur at the same rate. As shown in FIG. 1, the STC reference may be derived at the sender and at the recipient machines, which might be located in different states or countries, based upon a received radio frequency (RF) reference signal that is generated and broadcast over the airwaves. Note that this is just one of several ways to supply the STC reference. In some systems, the stratum clock is recovered from an uplink cable.

Each machine may be designed to handle two or more conversations, also referred to as voice channels, simultaneously. The architecture in FIG. 1 shows that each machine is equipped with a time division multiplexed (TDM) bus 0.120 that can transport multiple voice streams (multiple channels) between the voice processing device 114 and one or more voice capture devices 112 that are connected to the bus 120. Bus timing, and therefore the rate at which portions of each voice stream are placed on the bus or retrieved therefrom, is based upon a TDM bus clock signal that is derived from the STC reference 118. Matching the TDM bus clocks in the sender and recipient machines 106, 108 helps minimize any rate mismatch between the supply and consumption of digitized voice data, in the sender and recipient machines, respectively, so that the voice stream is transported over the TDM bus 120 in the recipient machine 108 at the same rate as the original voice stream was transported over the TDM bus in the sender machine 106. This helps improve poor voice quality, due to glitches and/or drops heard in the conversation, that may be caused by a rate mismatch.

The architecture in FIG. 1 illustrates a block diagram of the voice processing device 114 which may essentially be duplicated in the sender and recipient machines. The voice processing is performed by (1) host hardware/software 128 which may be based upon a processor-memory combination that runs a real time operating system (RTOS) and receives from and delivers voice packets to the network 104, (2) a digital signal processor (DSP) system 132 for efficiently performing compression/decompression and channel processing, such as echo cancellation, on voice packets, and (3) a TDM controller chip 136 for conducting direct memory access (DMA) between host memory and the DSP system 132. Examples of such a controller are the QUICC multichannel controller for the MC68360 controller by Motorola, Inc. and the 8474 MUSYCC chip by Brooktree Corp. The TDM chip 136 adjusts the timing for transporting voice data between the host memory and a buffered serial port of the DSP system 132, so that the delivery and pick-up of the voice stream at the TDM bus 120 occurs at essentially the same rate as their counterparts in the sender machine 106. Note that the TDM bus clock which is used to transfer voice data for a number of channels in a time multiplexed manner, is also derived from the STC reference, for instance using a clock recovery/phase locked loop (PLL) 138.

SUMMARY

A disadvantage to use of an additional dedicated chip for performing DMA between the host 128 and DSP 132 is that the product manufacturer is faced with a substantial increase in the cost of the circuit board on which the voice processing 114 is implemented. This is not just because of the significant, additional hardware that is required, but also because the software associated with configuring the TDM controller 136 for DMA-based host-to-DSP transfers is relatively complex and inflexible, and therefore platform-dependent. Since the voice processing 114 may be replicated for use in a wide range of telecommunication platforms, including customer premises equipment (CPE) and voice server cards in central office (CO) type equipment, it would be desirable to reduce the cost of such platforms by providing a more flexible, and hence more portable, voice processing solution. According to an embodiment of the invention, the voice processing logic for a node in a packet-based network includes a shared memory, a counter to be clocked by a signal derived from a stratum traceable clock (STC) reference, a host processor, a digital signal processor (DSP) system, and an interface to a time division multiplexed (TDM) bus. The host processor is to execute a number of instructions stored in program memory, to thereby process voice payload into a number of voice packets, where the voice payload has been obtained from a number of network packets sent by the sender machine through the network. The host system buffers the voice packets before writing them to the shared memory. One or more voice packets are written in response to a processor interrupt received from the counter, upon reaching a set count. The DSP system is to read the voice packets from the shared memory before processing them, while the TDM bus interface transmits voice data of one or more channels, from the packets processed by the DSP system, over the TDM bus and according to a TDM bus clock. This bus clock is also derived from the STC reference. In this way, the transfer of packets from the host to the DSP is controlled to correspond to the STC reference, so that the delivery and pickup of the voice stream at the TDM bus occurs at essentially the same rate as their counterparts in the sender machine. Such an effect may be achieved without requiring a dedicated TDM controller chip. Thus, from a hardware point of view, there may be a substantial reduction in cost and improvement in design flexibility if the TDM chip is not 6 necessary. In addition, because the control of the transfer of packets between the host and the DSP is, in a particular embodiment, provided by host software that runs over a real time operating system, and where such software may be sufficiently portable across a wide range of different telecommunications platforms, an additional reduction in cost may be obtained by reusing such software with minimal modifications across different platforms.

DETAILED DESCRIPTION

Figure 2:
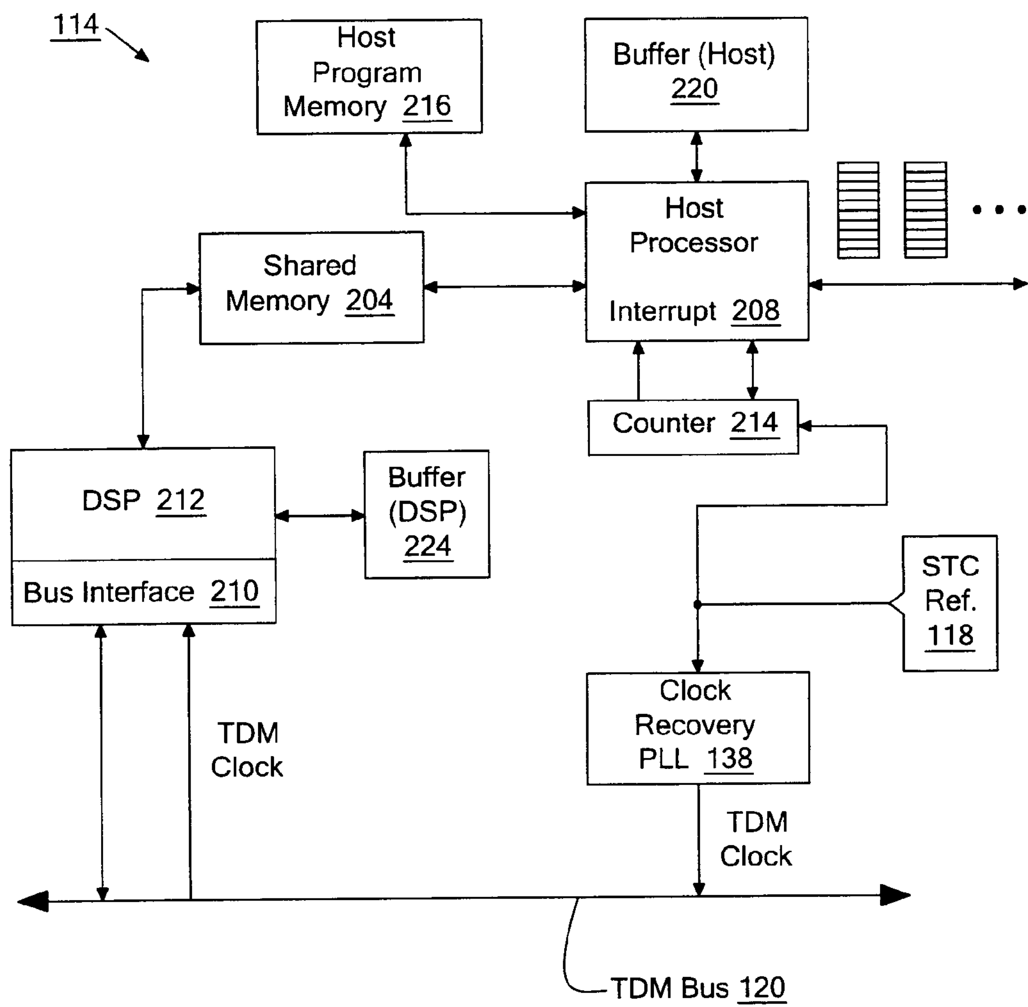
FIG. 2 illustrates a block diagram of voice processing according to an embodiment of the invention.

FIG. 2 illustrates a hardware architecture of an embodiment of the voice processing device 114. The voice processing architecture in FIG. 2 may be implemented in a wide range of telecommunications devices, including CPE and CO type equipment with digital voice capability. The CPE may be, for instance, the AN-30 Integrated Access Device by Accelerated Networks, Inc. which is equipped with either T1 digital voice ports or analog FXS voice ports to provide voice over digital subscriber line (DSL) or T1 service. The CO-type equipment may be, for instance, the AN-3200 Multi-Service Access Platform and similar types of DSL and T1 concentrators. A shared memory 204 is provided to store voice packets that are placed therein by a host processor 208. This shared memory may have a first in first out (FIFO) structure for each voice channel that can be accessed simultaneously and asynchronously by both the host processor 208 and a DSP 212. Access to the shared memory by the DSP 212 may be, for instance, using a packet based interface, such as the Host Port Interface (HPI) available with the TMS320C54x line of digital signal processors by Texas Instruments, Inc. Note that the HPI is not a special requirement for this solution. In general, any sufficiently fast interface may be used for the host processor to download into and control the DSP.

The voice processing device of FIG. 2 also includes a counter 214 to be clocked by a STC-derived signal. This counter may be a peripheral, on-chip device to a controller, such as in the MPC8620 POWER QUICC line of communication processors by Motorola Inc. For such an embodiment, the host processor 208 may be the MPC603e microprocessor also by Motorola Inc. The counter 214 is free running and may be programmable to automatically start over at a start count, upon reaching a pre-determined final count. The programming may be achieved by the host processor 208 executing instructions stored in host program memory 216. The counter 214 may be programmed to periodically generate an interrupt to the host processor 208 upon reaching the final count. This periodic interrupt interval should be selected in view of the requirements for transferring voice packets from the host system to the DSP via the shared memory 204, which will be discussed below.

Figure 1:
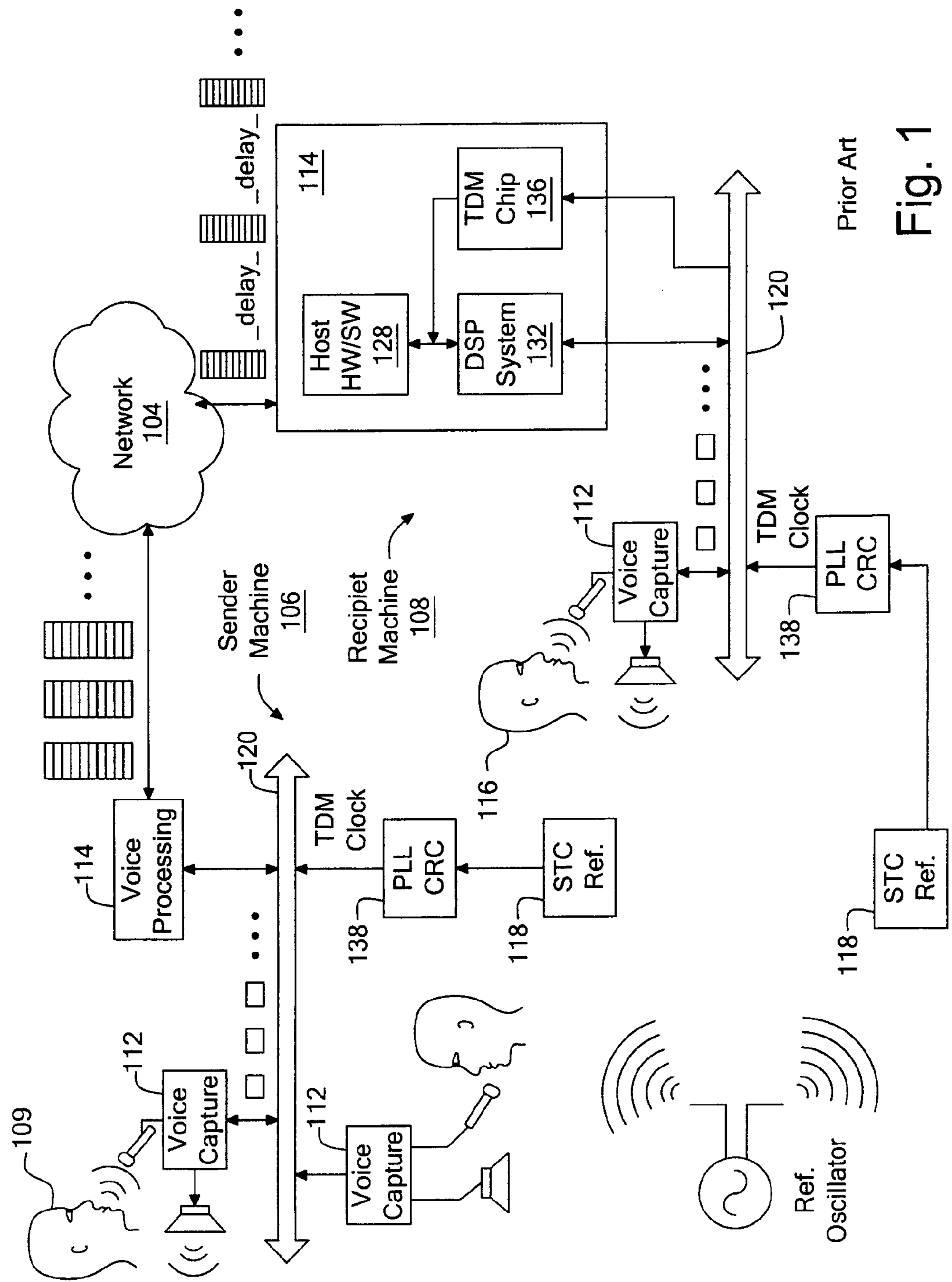
FIG. 1 illustrates a block diagram of a system for implementing voice communication over a packet-based network.

The host processor 208 is to process voice payload into a number of voice packets, where the payload has been obtained form a number of network packets sent by the sender machine 106 through the network 104 (see FIG. 1). Such processing may include high level protocol processing, for instance, application layer processing, asynchronous transfer mode (ATM) segmentation and reassembly (SAR), and processing of ATM adaptation layer (AAL) protocol data units. In addition, the processing may further include disassembling the AAL protocol data units (e.g. AAL1, compressed and AAL2, uncompressed) to recover octets for individual voice tributaries. Such octets are then stored, as voice packets in buffer (host) 220 in a circular FIFO structure.

The instructions stored in the host program memory 216 also configure the host processor 208 to buffer the voice packets before writing them to the shared memory 204, depending upon the expected jitter. As mentioned earlier, such buffering may be implemented using a circular FIFO structure. In addition, it should also be noted that the buffer (host) 220 and the host processor 208 may be placed on the same controller chip.

The transfer of voice packets from the buffer (host) 220 to the shared memory 204 are in response to a processor interrupt received from the counter 214.

The interrupt occurs each time the counter reaches its predetermined final count. The count is selected in view of the frequency of the STC reference 118, to give the shortest period between successive interrupts, referred to as a base interval, so that a wide range of longer intervals, which may be integer or other multiples of the base interval, to be generated. These longer intervals are then used, as described below, to control the timing of the transfer of packets from the host to the shared memory 204 to alleviate jitter in a number of voice channels. These intervals are selected depending upon the sizes of the host to DSP (H2D) packets and the voice encoding type. In addition, the size of these intervals should also be selected in view of the amount of buffering available in the voice processing device, including the capacity of the buffer (host) 220 as well as an optional buffer (DSP) 224, and the capacity of the shared memory 204.

A DSP 212 is to read the voice packets from the shared memory 204 before processing them in preparation for transfer to the TDM bus 120. For the embodiment of the invention that uses the HPI, the same interface may also be used by host software to initialize and control the DSP 212, in addition to of course passing packets to and from the DSP 212. The DSP 212 may feature its own program memory and instructions that configure it to process the voice packets before transferring the voice data to the TDM bus 120. Such processing may include echo cancellation and decompression for inbound H2D packets, and compression for outbound DSP to host (D2H) packets. An option here is to provide a buffer (DSP) 224 for further resistance to the possibility of an under run situation. The interface 210 between the DSP 212 and the TDM bus 120 may be according to a conventional bit driven I/O interface, such as the Buffered Serial Ports (BSPs) provided in DSPs by Texas Instrument, Inc., where these serial ports are driven by the TDM bus clock and have access to the shared memory.

Figure 3:
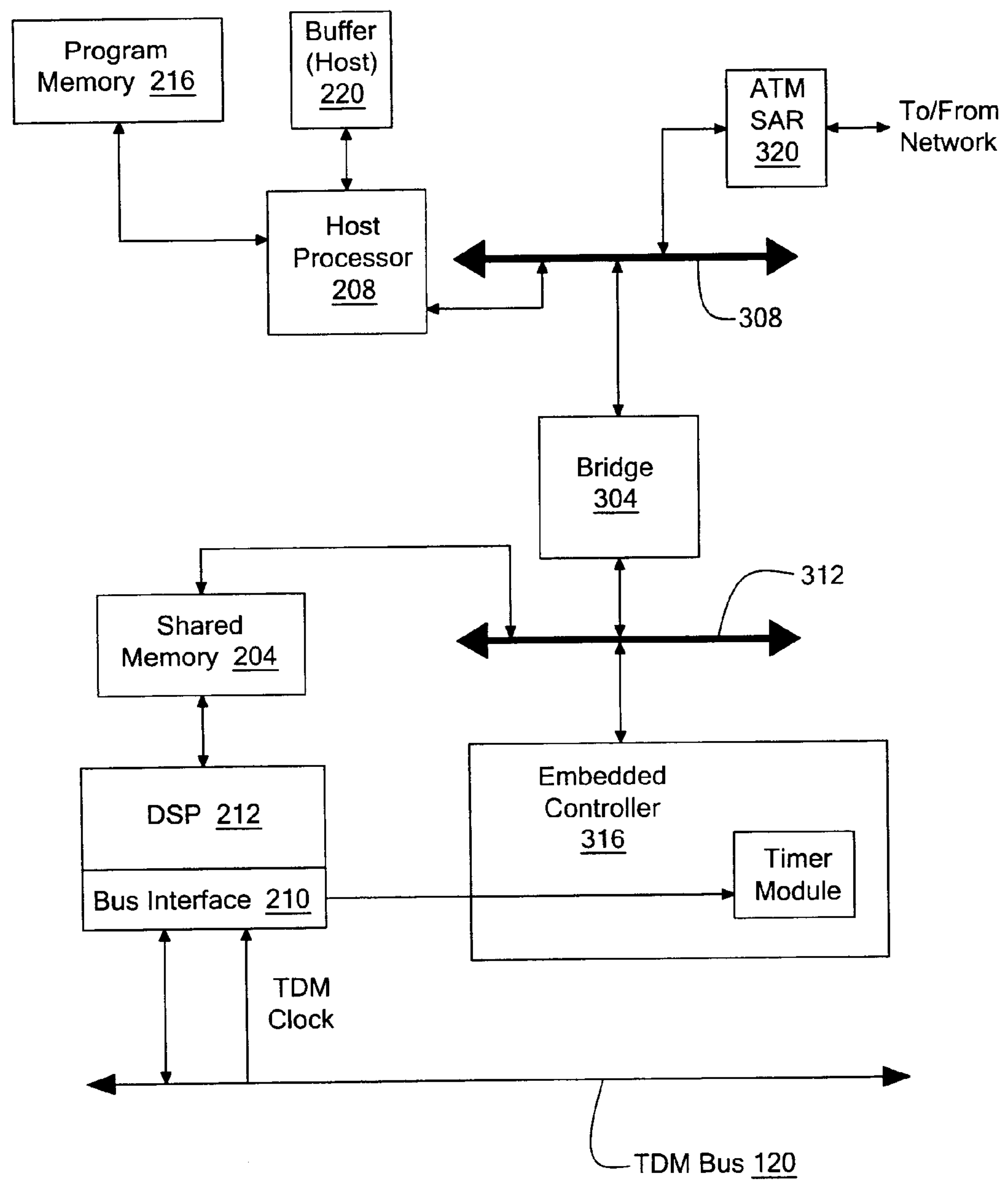
FIG. 3 illustrates another embodiment of the voice processing.

Additional hardware architectures for other embodiments are now described, prior to describing a common software architecture which may be used with essentially minimal variation across all of the different hardware platforms here. Turning now to FIG. 3, the connection between the host processor 208 and the shared memory 204 may alternatively be through a bus-to-bus bridge 304. A north bus 308 which connects to the host processor 208 may be a peripheral components interconnect (PCI) bus. A south bus 312 is accessed by both the shared memory 204 and an embedded controller 316, such as the MC68360 by Motorola Inc. In this embodiment, the transfer of packets from the host to the shared memory 204 is via the bridge 304. In addition, the mechanism for interrupting the host processor may also be through the bridge 304, by using, for instance, a PCI bus interrupt. The source of the interrupt signal is from a timer module in the embedded controller 316, which may be clocked by a TDM bus clock obtained by the TDM bus interface. At the host side, the network packets may be partially processed by dedicated hardware, rather than by host software, for instance, by ATM SAR hardware 320 as an agent on the PCI bus. The embodiment of FIG. 3 may prove to be particularly desirable for telecommunications devices such as the AN-30 Integrated Access Device by Accelerated Networks Inc.

Figure 4:
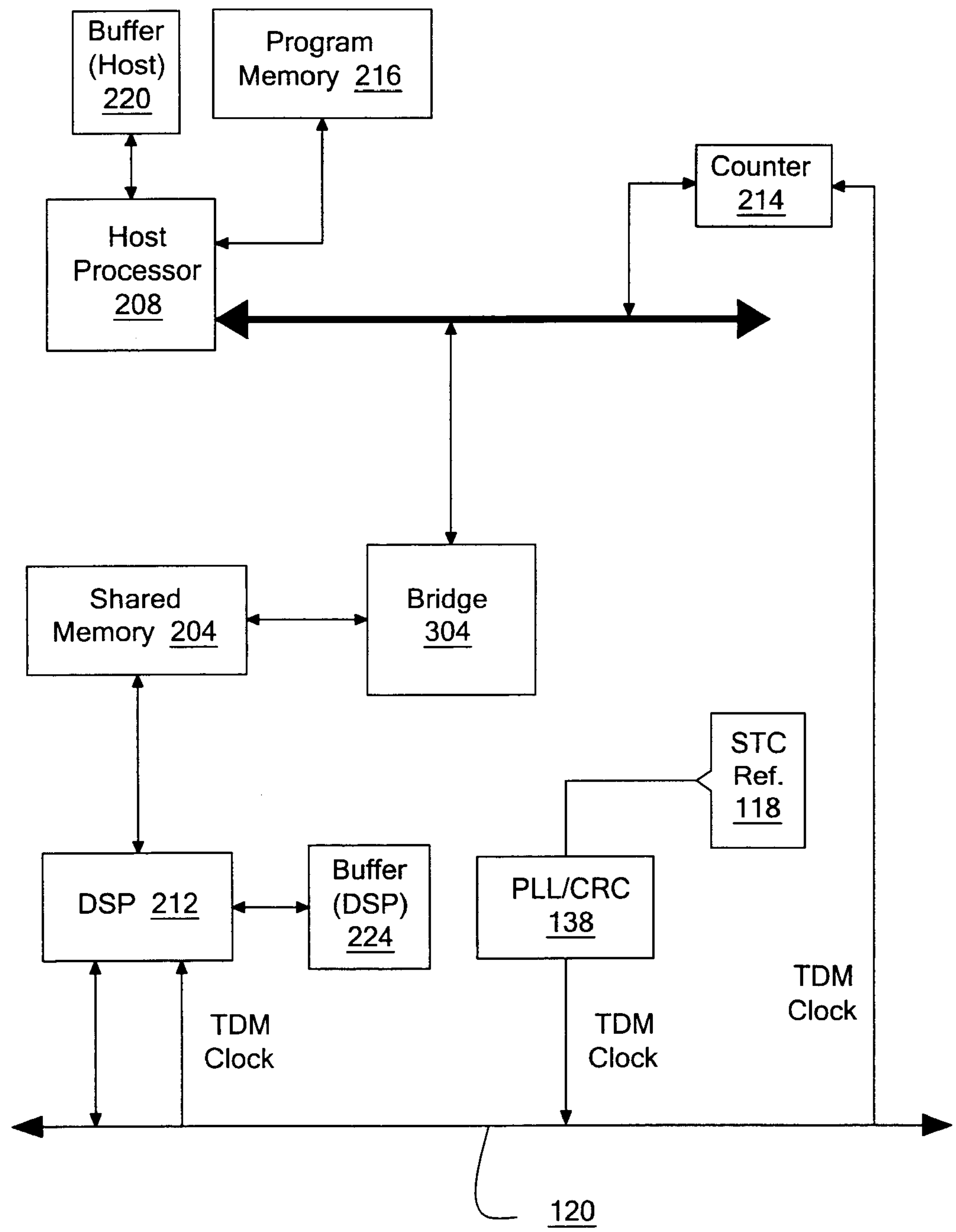
FIG. 4 depicts a block diagram of yet another embodiment of the voice processing.

Yet another embodiment of the voice processing may be according to the hardware architecture of FIG. 4, in which the counter 214 is clocked by the TDM bus clock directly. In FIG. 4, the counter 214 may be part of a field programmable gate array (FPGA) such as one provided by Xilinx Corp., where the counter can be programmed by writing to certain memory locations in the FPGA device.

Thus, a common feature of the embodiments of FIGS. 2–4 is the use of the counter 214, which is clocked by a signal derived from the STC reference, to interrupt the host processor 208 in a periodic manner, to control the timing of voice packet transfer between the host and the DSP. The sender machine may have voice processing that has essentially the same architecture as its counterpart in the recipient machine. However, note that the voice packets generated by the sender machine, for instance as speech of a first party to a two-way conversation, need not be the same size (the number of bits or bytes in the packet) as the voice packets that are generated and buffered by the host system in the recipient machine. This may be acceptable so long as the host system and the counter 214 are configured to transfer voice packets to the DSP 212 at a rate that allows the voice stream for each channel to be recreated on the recipient TDM bus 120 at essentially the same rate as voice data for the same channel is transferred over the sender TDM bus. This effect may be achieved by deriving the periodic interrupt intervals (by the counter 214) from a STC reference where it is also understood that the timing of the sender TDM bus has also been derived from a STC reference.

Figure 5:
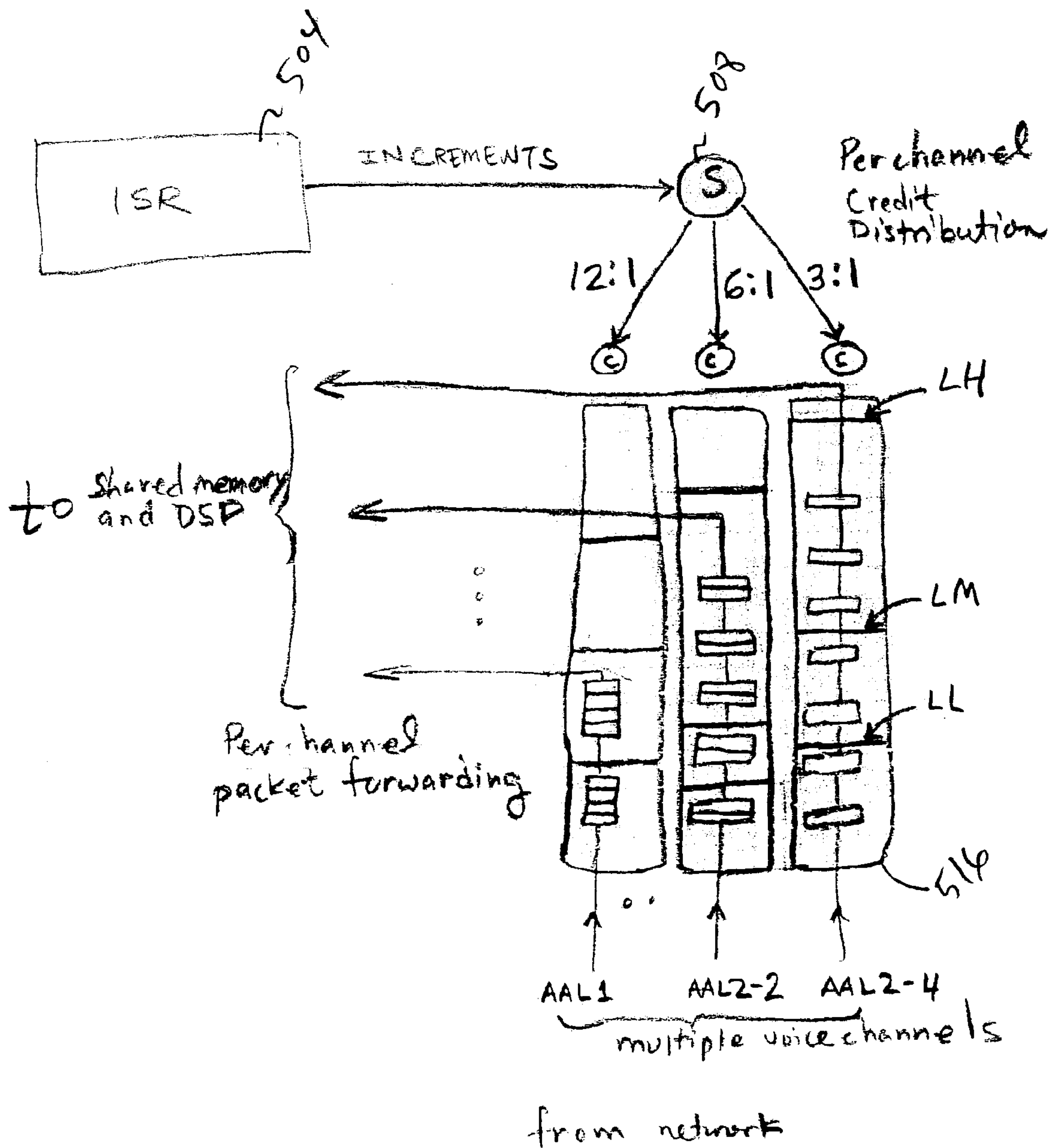
FIG. 5 illustrates an embodiment of a software methodology for voice processing.

FIG. 5 illustrates a software methodology that may be highly portable across the different hardware platforms described. This methodology, including its subroutines as well as library routines, may be written in any suitable programming language, for instance, the high level C programming language. An interrupt service routine (ISR) 504 can be executed by the host processor in response to each interrupt. For host systems running a RTOS, such as VxWorks by Wind River Systems Inc., the ISR 504 may increment a semaphore 508 which is used to distribute credits on a per voice channel basis. In each voice channel, the voice payload may be stored in an octet or packet oriented queue 516. Voice data, such as in bytes, may be packed into a fixed size packet and stored in such a queue before being forwarded to the shared memory. The size of each packet may depend upon the type of voice channel. For instance, the packet size for AAL1 may be four units, whereas for a 2-to-1 compression obtained by AAL2, the packet size is ½that of AAL1. Similarly, if the voice payload received from the network has been compressed 4-to-1, then the packet size for such a channel is ¼that of AAL1. In this way, the amount of voice data forwarded in response to an interrupt, from the point of view of the playback time interval for each packet, may be the same.

The per channel credit distribution technique works as follows. A packet may be forwarded from a queue when the queue's credit variable C>0, where C may be either an integer or floating point variable. The rate at which C is incremented by the semaphore 508 may be a multiple of the base interrupt rate which invokes the ISR 504. For instance, if the base interrupt interval is 0.5 msec, and the timing associated with AAL1 packets is such that one packet must be transferred from the host to the DSP every 6 msec, then C for the AAL1 queue is incremented once every 12 increments received from the ISR 504. Similarly, for AAL2 packets in which the voice data is compressed 2-to-1 as compared to that in the AAL1 packet, the credit C for this queue is incremented once very 6 ISR increments. It follows therefore that for a voice channel which exhibits a 4-to-1 compression as compared to AAL1, the credit distribution occurs in the ratio of 3 ISR increments to 1.

After a packet has been forwarded, in a particular channel, to the shared memory, variable C corresponding to that channel or queue is decrimented. The system may be initialized by setting C to 1 when packet forwarding begins. Such a scheme also allows more than one packet to be forwarded to the shared memory in response to C>0. Such a situation may occur, for instance, if the queue has been starved due to unusually large delays encountered in receiving packets from the network, and that the variable C for that queue has meanwhile been incremented several times. Thus, to "catch up" once the packets have arrived, the software may be configured to forward multiple packets from that queue, equal to the current value of the variable C.

It should be noted that the base interrupt rate need not be equal to the rate of the TDM bus clock. The semaphore is configured to understand the frequency relationship between the generation of the base interrupts, the TDM bus clock, the number and types of voice channels (including the packet size in each voice channel.) This understanding is reflected in the credit distribution scheme that has just been described.

To compensate for network jitter and transient disturbances, it may be preferable to qualify the forwarding of packets in accordance with the state of each queue. For instance, three queue thresholds LH, LM and LiL may be defined as shown in FIG. 5, such that (1) voice data is discarded when the queue level rises above the upper threshold LH (so that the level is brought down to LM), (2) forwarding is stopped, even when C>0, if the queue level falls below the lower threshold LL, and (3) forwarding does not resume until the queue level rises back up to LM. These thresholds may be set depending upon the expected jitter, may be different for each voice channel, and may depend upon the capacity of the queue.

The ISR is executed in response to each interrupt. The other two routines, namely the credit distribution routine and the per channel packet forwarding routine, may alternatively be scheduled by the operating system to run in predetermined time intervals. However, use of such an alternative should be balanced against the risk for higher jitter if the routines do not run often enough, despite the fact that such a timed execution may reduce the voice processing load on the host processor.

The above description has focused on hardware and software architectures for voice processing by the host system, that enable a controlled delivery of packets to the shared memory 204. Once these packets have been transferred to the shared memory 204, a conventional technique, for instance, using the HPI as mentioned above, may be used by the DSP 212 to pull voice packets from the shared memory and deliver the voice data stream for one or more channels on to the TDM bus 120. Because the transfer from the host to the DSP is controlled so as to in effect match the rate at which the voice stream was picked off of the sender's TDM bus 120 (see FIG. 1), there is no need for closed loop control of the DSP 212 by the host system. The DSP 212 may, accordingly, be designed to access the shared memory 204 independent of the transfer of packets into the shared memory 204, to fulfill the need for voice data as dictated by the TDM bus clock. Moreover, although a separate TDM controller may be provided, the embodiments of the voice processing logic make such a feature generally unnecessary, except perhaps for obtaining additional performance (e.g. when there are a large number of voice channels) between the host and the TDM bus.

To summarize, various embodiments of the invention have been described that are directed to voice communication over a packet-based network, and more particularly to various hardware/software architectures of a node in the network that may help reduce jitter. In the foregoing specification, the invention has been described with reference to specific exemplary embodiments thereof. It will, however, be evident that various modifications and changes may be made thereto without departing from the broader spirit and scope of the invention as set forth in the appended claims. For instance, the software architecture described above calls for instructions that are stored in a machine-readable medium, such as firmware stored in non-volatile semiconductor memory (e.g. one or more chips) to be executed by the host processor. This hardware and software may be part of an article of manufacture such as CPE or CO type equipment that connects to any type of packet-based data network and is not limited to one that is based on ATM. The hardware may be placed on a single printed wiring board in such equipment, or it may be distributed across different boards. An example is a voice server card that features the hardware architecture of FIG. 3, for use in CO-type equipment. Yet another alternative would be to integrate all of the functionality described above for the hardware and software onto a single packaged IC. The specification and drawings are, accordingly, to be regarded in an illustrative rather than a restrictive sense.

What is claimed is:

1. An article of manufacture comprising:

shared memory;

program memory to store a plurality of instructions;

a counter to be clocked by a signal derived from a stratum traceable clock (STC) reference;

a processor to execute the plurality of instructions stored in the program memory and thereby (1) process voice payload into voice packets for one or more channels, the voice payload having been obtained from a plurality of network packets sent by a sender machine through a network, and (2) buffer the voice packets before writing them to the shared memory, wherein one or more of the buffered voice packets are written by the processor in response to and only if an interrupt is received from the counter;

a digital signal processor (DSP) system to read the plurality of voice packets from the shared memory before processing them; and an interface to a bus, to transmit voice data of one or more channels, from the voice packets processed by the DSP system, over the bus and according to a bus clock, wherein the bus clock is derived from the STC reference signal.

2. The article of manufacture of claim 1 wherein the interface is to a time division multiplexed (TDM) bus, and the bus clock is a TDM bus clock.

3. The article of manufacture of claim 2 wherein the shared memory implements a first in first out (FIFO) structure, for storing the voice packets, that can be accessed independently by both the processor and the DSP system.

4. The article of manufacture of claim 3 wherein the shared memory is made of static RAM, and the program memory is made of dynamic RAM.

5. The article of manufacture of claim 1 wherein the counter and the processor are on the same chip.

6. The article of manufacture of claim 1 wherein the program memory includes further instructions which, when executed by the processor, cause the network packets to be processed at an application layer.

7. The article of manufacture of claim 6 wherein the program memory includes further instructions which, when executed by the processor, cause the network packets to be processed at an asynchronous transfer mode (ATM) adaptation layer.

8. The article of manufacture of claim 7 wherein the program memory includes further instructions which, when executed by the processor, cause the network packets to be disassembled to recover octets for individual voice tributaries.

9. The article of manufacture of claim 1 wherein some of the voice packets to be stored in the shared memory contain compressed speech data, and wherein the DSP system is to decompress such speech data before transmission over the bus.

10. The article of manufacture of claim 1 wherein the DSP system is to process the voice packets by decoding the packets, including one or more of format changing, decompression, and echo cancellation, before transmission over the bus.

11. The article of manufacture of claim 1 wherein the program memory includes further instructions which, when executed by the processor, cause the counter to be programmed to periodically interrupt the processor at a base rate, such that voice data for a given channel is transferred into the bus at essentially the same rate as voice data for the same channel is collected off a bus in the sender machine.

12. The article of manufacture of claim 1 further comprising:

a bridge coupled between the processor and the shared memory, to forward the voice packets from the processor to the shared memory and forward the interrupt from the counter to the processor.

13. The article of manufacture of claim 12 further comprising:

an embedded controller coupled to the bridge and containing a timer module, the counter being part of the timer module.

14. The article of manufacture of claim 13 wherein the signal that clocks the counter is provided by the DSP system, based upon the bus clock.

15. The article of manufacture of claim 1 further comprising:

a bridge coupled to forward the voice packets from the processor to the shared memory, and wherein the signal that clocks the counter is derived from the bus clock.

16. An article of manufacture comprising:

a machine-readable medium having instructions stored therein which when executed by a set of processors cause (a) a counter to be programmed to repeatedly generate an interrupt to a first one of the processors at a base rate, the base rate being obtained by clocking the counter with a stratum traceable clock, STC-derived signal, (b) voice payload, received from a sender machine through a packet-based network, to be processed by the first processor into a plurality of voice packets, and (c) one or more of the voice packets to be repeatedly written from a buffer to a memory shared by the first processor and a second one of the processors, at a rate derived from the base rate.

17. The article of manufacture of claim 16 wherein the machine-readable medium includes further instructions which, when executed by the set of processors, cause the second processor to process one or more of the voice packets obtained from the shared memory before transmitting them over a bus according to a STC-derived clock.

18. The article of manufacture of claim 17 wherein the base rate is such that voice data in the voice packets, for a given channel, is transferred into the bus at essentially the same rate as voice data for the same channel is collected off a bus in the sender machine.

19. The article of manufacture of claim 18 wherein the machine-readable medium includes volatile and non-volatile semiconductor memory to store the instructions.

20. The article of manufacture of claim 16 wherein the instructions further provide a real time operating system for the first processor, the operating system having a first variable that is updated by an interrupt service routine, in response to each interrupt.

21. The article of manufacture of claim 20 wherein the instructions update a respective credit variable for each voice channel in response to the first variable being changed, the updating of the respective credit variable being a function of a packet size for each channel.

22. The article of manufacture of claim 21 wherein the instructions forward packets from a buffer to the shared memory, based upon the buffer contents satisfying predetermined thresholds between completely full and completely empty.

23. A method comprising:

programming a counter to repeatedly generate an interrupt to a first processor at a base rate, the base rate being obtained by clocking the counter with a stratum traceable clock, STC-derived signal;

processing voice payload, received from a sender machine through a packet-based network, into a plurality of voice packets; and repeatedly writing one or more of the voice packets from a buffer to a memory shared by the first processor and a second processor, at a rate derived from the base rate.

24. The method of claim 23 further comprising:

processing one or more of the voice packets obtained from the shared memory, before transmitting them over a bus according to a STC-derived clock.

25. The method of claim 24 wherein the base rate is such that voice data in the voice packets, for a given channel, is transferred into the bus at essentially the same rate as voice data for the same channel is collected off a bus in the sender machine.

26. The method of claim 23 further comprising:

updating a first variable of a real time operating system in response to each interrupt.

27. The method of claim 26 further comprising:

updating a respective credit variable for each voice channel in response to the first variable being changed, the updating of the respective credit variable being a function of a packet size for each channel.

28. The method of claim 27 further comprising:

forwarding packets from the buffer to the shared memory, based upon the buffer contents satisfying predetermined thresholds between completely full and completely empty.

* * * * *